US011676292B2

(12) United States Patent
LeGendre et al.

(10) Patent No.: US 11,676,292 B2
(45) Date of Patent: Jun. 13, 2023

(54) MACHINE LEARNING INFERENCE ON GRAVITY ALIGNED IMAGERY

(71) Applicant: GOOGLE LLC, Mountain View, CA (US)

(72) Inventors: Chloe LeGendre, Culver City, CA (US); Ranjith Kagathi Ananda, Mountain View, CA (US); Ran Tao, San Ramon, CA (US); Wim Meeussen, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 17/304,509

(22) Filed: Jun. 22, 2021

(65) Prior Publication Data
US 2021/0312646 A1 Oct. 7, 2021

Related U.S. Application Data

(63) Continuation of application No. 16/643,213, filed as application No. PCT/US2019/057218 on Oct. 21, 2019, now Pat. No. 11,069,075.

(51) Int. Cl.
G06T 7/37 (2017.01)
G06T 7/73 (2017.01)
G06T 11/00 (2006.01)

(52) U.S. Cl.
CPC ............... G06T 7/37 (2017.01); G06T 7/73 (2017.01); G06T 11/00 (2013.01); G06T 2207/20081 (2013.01); G06T 2207/20084 (2013.01); G06T 2207/30201 (2013.01)

(58) Field of Classification Search
CPC ............... G06T 7/70–77; G06T 11/00; G06T 2207/20081; G06T 2207/20084; G06T 2207/30201; G06T 19/006; G06F 3/0346; G06K 9/32; G06K 9/3208; G06K 9/3275
See application file for complete search history.

(56) References Cited

U.S. PATENT DOCUMENTS

| 2014/0201126 A1* | 7/2014 | Zadeh ................... A61B 5/165 706/52 |
| 2019/0102936 A1 | 4/2019 | Neulander et al. |
| 2021/0142497 A1* | 5/2021 | Pugh ....................... G06T 7/90 |

OTHER PUBLICATIONS

Oda, Ohan, and Steven Feiner. "Rolling and shooting: two augmented reality games." CHI'10 Extended Abstracts on Human Factors in Computing Systems. . (Year: 2010).*

(Continued)

Primary Examiner — Diane M Wills
(74) Attorney, Agent, or Firm — Brake Hughes Bellermann LLP

(57) ABSTRACT

Systems, methods, and computer program products are described that include obtaining, at a processor, a first image from an image capture device onboard a computing device, detecting, using the processor and at least one sensor, a device orientation of the computing device associated with capture of the first image, determining, based on the device orientation and a tracking stack associated with the computing device, a rotation angle in which to rotate the first image, rotating the first image to the rotation angle to generate a second image, and generating neural network based estimates associated with the first image and the second image.

20 Claims, 8 Drawing Sheets

(56) References Cited

OTHER PUBLICATIONS

Rowley et al., "Rotation Invariant neural network-based face detection", Proceedings, 1998 IEEE Computer Society Conference on Computer Vision and Pattern Recognition (Cat. No. 98CB36231). IEEE (Year: 1998).*

International Search Report and Written Opinion for Application No. PCT/US2019/057218; dated Dec. 13, 2019.

"Rotate Photos To Be Upright—Sirv Support Center", Web Srchive, https://sirv.com/help/resources/rotate-photos-to-be-upright/, May 8, 2019, 10 pages.

Crouse, et al., "Continuous Authentication of Mobile User: Fusion of Face Image and Inertial Measurement Unit Data", International Conference on Biometrics (ICB), May 2015, 8 pages.

Eyjolfsdottir, et al., "Multisensory Embedded Pose Estimation", Applications of Computer Vision, IEEE Workshop ON, Jan. 5, 2011, 8 pages.

Gardner, Marc-Andre, et al., "Learning To Predict Indoor Illumination From a Single Image", arXiv:1704.00090v3, Nov. 2017, 14 pages.

Hold-Geoffroy, et al., "Deep Outdoor Illumination Estimation", CVPR, 2017, pp. 7312-7321.

Kurz, Daniel, et al., "Gravity-Aware Handheld Augmented Reality", 10th IEEE International Symposium on Mixed and Augmented Reality, 2011, pp. 111-120.

Legendre, et al., "Composition Real and Virtual Objects With Realistic, Color-Accurate Illumination", Computer Science, Aug. 2019, 20 pages.

Legendre, et al., "Deeplight: Learning Illumination for Unconstrained Mobile Mixed Reality", arxiv.org, Cornell University Library, Apr. 2, 2019, 11 pages.

Rowley, H, et al., "Rotation Invariant Neural Network-Based Face Detection", CMU-CS-97-201, Dec. 1997, pp. 1-13.

Williams, et al., "Hybrid Tracking Using Gravity Aligned Edges", Proceedings of the 14th Annual ACM Sigchi_NZ Conference on Computer-Human Interaction, 2013, 8 pages.

Zhang, Hongming, et al., "Combining Skin Colo Model and Neural Network for Rotation Invariant Face Detection", ICMI, LNCS 1948; Springer-Verlag Berlin Heidelberg, 2000, pp. 237-244.

* cited by examiner

| 402 Phone Orientation | 404 VGA Image | 406 Gravity Aligner (CCW) | 408 VGA Image (After Rotation, to be fed to NN) | 410 Display Rotation |
|---|---|---|---|---|
| 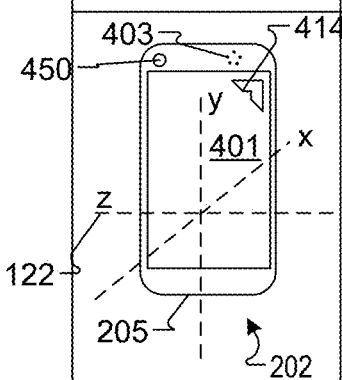 | 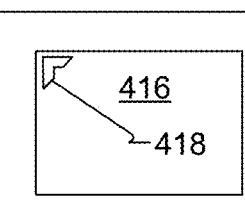 | 270° | 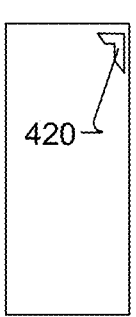 | 0 |
| 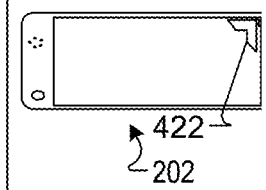 | 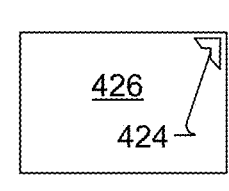 | 0° | 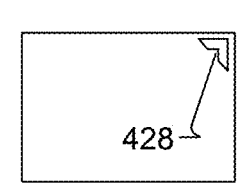 | 1 |
| 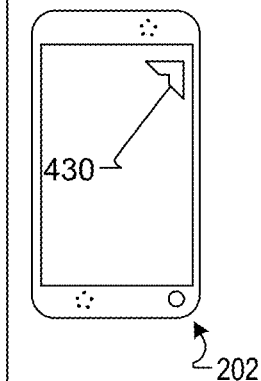 | 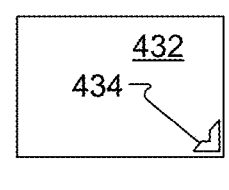 | 90° | 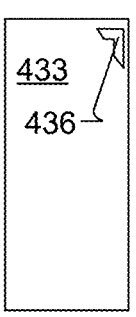 | 2 |
| 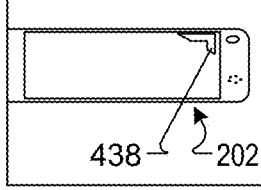 | 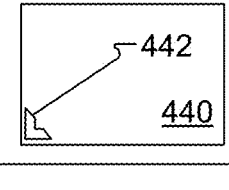 | 180° | 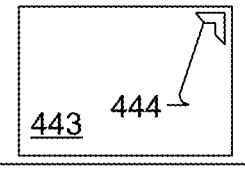 | 3 |
FIG. 4

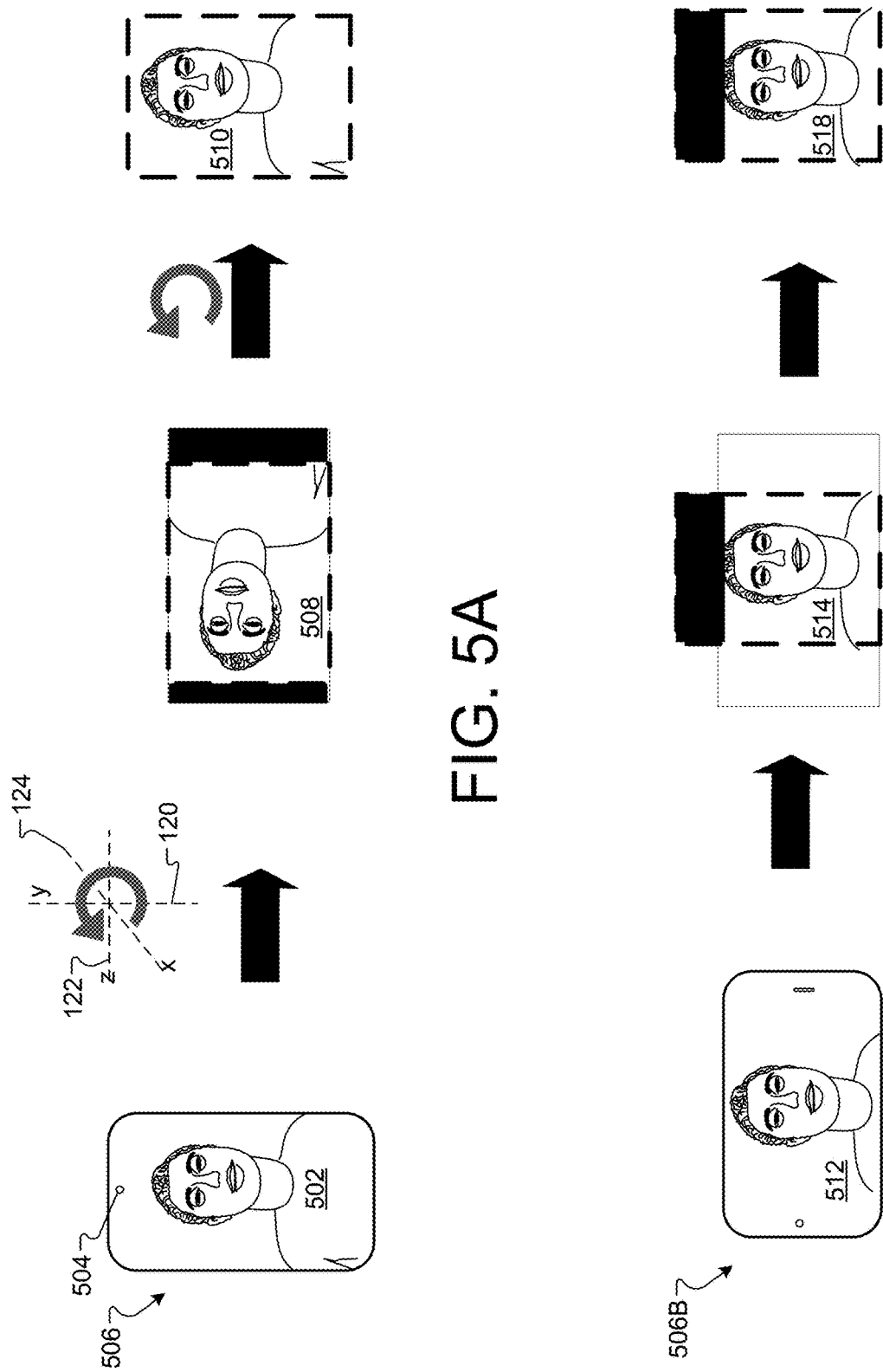

MACHINE LEARNING INFERENCE ON GRAVITY ALIGNED IMAGERY

CROSS-REFERENCE TO RELATED APPLICATIONS

This application claims priority to, and is a continuation of, U.S. Nonprovisional patent application Ser. No. 16/643,213, filed on Feb. 28, 2020, entitled "MACHINE LEARNING INFERENCE ON GRAVITY ALIGNED IMAGERY", which is a national stage entry of PCT Application No. US2019/057218, filed on Oct. 21, 2019, entitled "MACHINE LEARNING INFERENCE ON GRAVITY ALIGNED IMAGERY", the disclosures of which are incorporated by reference herein in their entireties.

TECHNICAL FIELD

This disclosure relates to Virtual Reality (VR) and/or Augmented Reality (AR) experiences and determining alignment aspects for images captured by mobile devices.

BACKGROUND

Augmented Reality (AR) devices are configured to display one or more images and/or objects over a physical space to provide an augmented view of the physical space to a user. The objects in the augmented view may be tracked by tracking systems that detect and measure coordinate changes for the moving objects. Machine learning techniques can also be used to track moving objects in AR and to predict where the objects may move throughout an AR scene.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer program product is described that includes obtaining, at a processor, a first image from an image capture device onboard a computing device, detecting, using the processor and at least one sensor, a device orientation of the computing device associated with capture of the first image, determining, based on the device orientation and a tracking stack associated with the computing device, a rotation angle in which to rotate the first image, rotating the first image to the rotation angle to generate a second image, and providing the second image as gravity-aligned content to at least one machine learning model, associated with the computing device, to trigger at least one Augmented Reality (AR) feature associated with the first image.

Particular implementations of the computer program product may include any or all of the following feature. For example, the at least one sensor may include or have access to the tracking stack corresponding to trackable features captured in the first image. In some implementations, the at least one sensor is an Inertial Measurement Unit (IMU) of the computing device and the tracking stack is associated with changes detected at the computing device. In some implementations, the second image is generated to match a capture orientation associated with previously captured training data. In some implementations, the first image is a live camera image feed generating a plurality of images and the plurality of images are continuously aligned based on detected movement associated with the tracking stack. In some implementations, the computer program product may include a step of generating, using the plurality of images, input for a neural network, the input including generated landscape oriented images based on captured portrait oriented images.

In a second general aspect, a computer-implemented method is described. The method may include obtaining, at a processor, a first image from an image capture device included on a computing device, detecting, using the processor and at least one sensor, a device orientation of the computing device and associated with capture of the first image, determining, based on the orientation, a rotation angle in which to rotate the first image, rotating the first image to the rotation angle to generate a second image, and providing, using the processor, the second image to at least one neural network to generate a lighting estimate for the first image based on the second image.

Particular implementations of the computer-implemented method may include any or all of the following features. For example, the detected device orientation may occur during an Augmented Reality (AR) session operating on the computing device. In some implementations, the lighting estimate is rotated at an inverse of the rotation angle. In some implementations, the first image is rendered in the AR session on the computing device and using the rotated lighting estimate. In some implementations, AR content is generated and rendered as an overlay on the first image using the rotated lighting estimate.

In some implementations, the second image is generated to match a capture orientation associated with previously captured training data, and wherein the second image is used to generate landscape oriented lighting estimates. In some implementations, the rotation angle is used to align the first image to generate a gravity aligned second image. In some implementations, the at least one sensor includes a tracking stack associated with tracked features captured in the live camera image feed. In some implementations, the at least one sensor is an Inertial Measurement Unit (IMU) of the computing device and movement changes represent a tracking stack associated with the IMU and the computing device.

In some implementations, the first image is a live camera image feed generating a plurality of images and the plurality of images are continuously aligned based on detected movement changes associated with the computing device.

In a third general aspect, a system is described that includes an image capture device associated with a computing device, at least one processor, and memory storing instructions that, when executed by the at least one processor, cause the system to obtain, at a processor, a first image from the image capture device, detect, using the processor and at least one sensor, a device orientation of the computing device and associated with capture of the first image, detect, using the processor and the at least one sensor, movement changes associated with the computing device, determine, based on the orientation and the movement changes, a rotation angle in which to rotate the first image, and rotate the first image to the rotation angle to generate a second image. The instructions may also and generate a face tracking estimate for the first image based on the second image and according to the movement changes.

Particular implementations of the system may include any or all of the following features. For example, the image capture device may be a front-facing image capture device or a rear-facing image capture device of the computing device. In some implementations, the first image is captured using the front-facing image capture device and the first image includes at least one face rotated at the rotation angle to generate the second image, the second image being aligned with eyes associated with the face located above a mouth associated with the face. In some implementations, the movement changes are associated with an Augmented Reality (AR) session operating on the computing device, the face tracking estimate is rotated at an inverse of the rotation angle, and the first image is rendered in the AR session on the computing device and the second image is provided as gravity-aligned content to at least one machine learning model associated with the computing device, to trigger an Augmented Reality (AR) experience associated with the first image and the rotated face tracking estimate.

In some implementations, the second image is used as input to a neural network to generate landscape oriented content with at least one gravity aligned face in the content. In some implementations, the first image is a live camera image feed generating a plurality of images and the plurality of images are continuously aligned based on the detected movement changes associated with the computing device. In some implementations, the second image is generated to match a capture orientation associated with previously captured training data, and the second image is used to generate landscape oriented face tracking estimates. In some implementations, the at least one sensor is an Inertial Measurement Unit (IMU) of the computing device and the movement changes represent a tracking stack associated with the IMU and the computing device.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

FIG. 4 is an example illustrating a computing device orientation map and translation of such orientations used to perform gravity-based alignment, according to example implementations.

FIGS. 5A-5D illustrate an example of providing gravity-based alignment for face tracking in an AR experience, according to example implementations.

The use of similar or identical reference numbers in the various drawings is intended to indicate the presence of a similar or identical element or feature.

DETAILED DESCRIPTION

Figure 1:
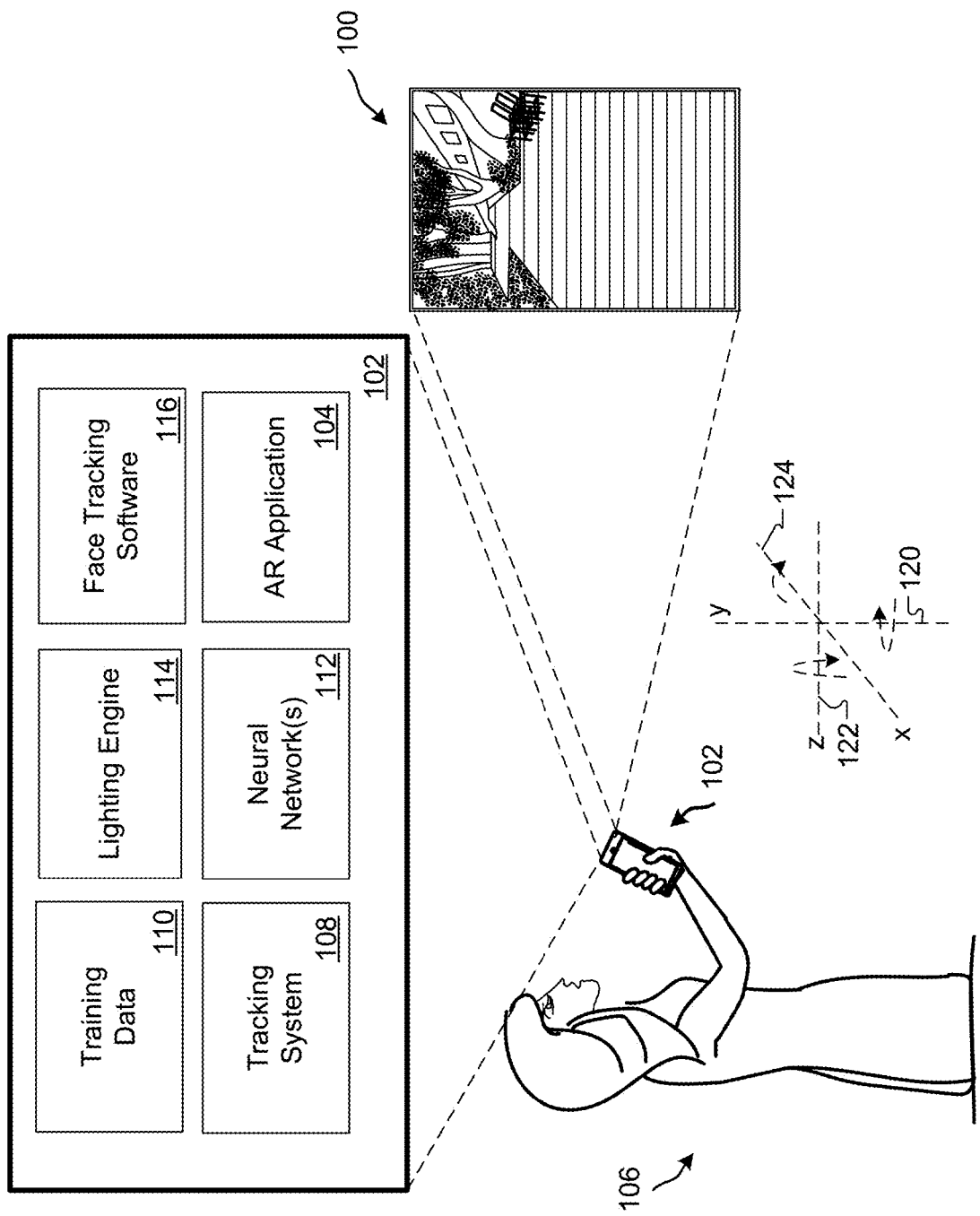
FIG. 1 illustrates an example Augmented Reality (AR) scene captured with various lighting characteristics, according to example implementations.

Machine learning models that utilize neural networks may receive images as input in order to provide any number of types of output. One such example output includes image classification, in which the machine learning model is trained to indicate a class associated with an object in an image. Another example includes object detection in which the machine learning model is trained to output the specific location of an object in the image. Yet another example includes the class of image to image translation, in which the input is an image and the output is a stylized version of the original input image. Other examples can include, but are not limited to, facial feature tracking for Augmented Reality (AR) (e.g., localizing 2D facial features from an input image or video), facial mesh generation for AR (e.g., inferring a 3D face mesh from an input image or video), hand, body, and/or pose tracking, and lighting estimation for AR (e.g., estimating scene illumination from an input image to use for realistically rendering virtual assets into the image or video feed).

In general, the machine learning models (e.g., using neural networks) described herein may be configured to receive images that are gravity aligned (e.g., standardized to indicate an upward alignment) where image content expected to be near a top of a captured image is, in fact, near the top of the image. For example, the sky or ceiling in an image is generally expected to be near the top of an image, if the image is configured and/or or captured with a camera device in an upright orientation. Using gravity aligned images and/or objects as input to a neural network may ensure that directional content (e.g., heads, faces, sky, ceiling, etc.) may be considered as standardized with other images (e.g., orthogonal to the ground (floor). Any lighting and/or tracking associated with such a gravity-based alignment may be properly estimated using the neural networks, if particular elements are corrected and/or confirmed to be upright (e.g., gravity aligned in an upright position with respect to the ground/bottom of an image) before being generated using the neural network, for example.

The systems and techniques described herein may provide an advantage of correcting for image content in a non-gravity aligned orientation. For example, the systems described herein may detect that a user is accessing an AR session in a landscape orientation on a computing device. Such detection can trigger modification to particular image content to avoid providing inaccurately (e.g., improperly) aligned content to a neural network that is configured to estimate lighting (e.g., illumination) for the image content, as described in further detail below.

The techniques described herein can be used to align images used to estimate and/or calculate lighting aspects for an AR scene in an AR session to ensure realistic lighting estimation when compositing rendered virtual content into the scenes. The techniques described herein may include the use of algorithms and neural networks that account for determining when and how to gravity align an image (e.g., tilt the image to ensure proper orientation for tracking and/or lighting purposes) so that the gravity aligned image is used when estimating lighting and/or tracking for the image. The gravity-based aligned image may be provided to a neural network, for example, to generate lighting estimations and/or perform face tracking for landscape-oriented AR sessions.

If the computing device is detected to be in an orientation other than a portrait orientation, the systems and techniques described herein can generate realistic lighting for an AR session using machine learning models (e.g., neural networks) to infer particular aspects of a scene (e.g., image) based on device orientation and device tracking metrics. In addition, the systems and techniques described herein may generate additional training data for the neural networks. For example, the systems and techniques described herein may generate data for estimating lighting for images displayed in a landscape mode using one or more images captured in a portrait mode. In addition, missing and/or corrective image data may be generated using gravity-based alignment to infer an upright position of a particular image when using such an image as input to a neural network. Gravity-based alignment may be used to ensure that a particular image is oriented upright when provided as input to a neural network, for example, regardless of the angle that a computing device is held at during capture of the images (using an onboard camera). Gravity-based alignment may be performed continuously on images (e.g., video) from a stored or live camera image feed, for example, based on movement changes corresponding to movements of a computing device.

The systems and techniques described herein can provide an improved lighting solution for AR, VR, and/or MR by computing a gravity-based alignment for input images before providing such images to one or more neural networks. The gravity-based alignment of input images can ensure that directional content in images is considered when generating realistic lighting for an image or object and/or a scene containing the image or object.

The systems and techniques described herein may provide an advantage of using image orientations measured by sensors, for example, to execute machine learning models on a computing device to learn ways of modifying image content. For example, a computing device containing at least one image sensor (e.g., a camera, an Inertial Measurement Unit (IMU), a tracking stack, etc.) and other sensors simultaneously used for tracking can be measured and provided to the machine learning models (e.g., neural networks) to produce properly oriented (e.g., upright) and realistic lighting for images captured by the device. Beyond reducing the difficulty of each machine learning problem, determining how to rotate particular images to achieve an upright input to the neural network may additional enable the techniques to simulate landscape oriented training imagery when portrait-only oriented training imagery has been acquired for training.

In some implementations, the systems and techniques described herein may incorporate determined orientation knowledge indicating an upright position for a given input image for use when tracking faces captured in an image and tracking content around the faces. For example, for a facial feature tracker, the techniques can determine if faces in an input image received at a model (e.g., a neural network model/machine learning model) are properly rotated such that the eyes are above the nose and mouth of a user in the image. The model can learn the spatial relationship between different parts of the face, and can be configured to be less likely to provide predictions in which eyes are below the mouth.

Similarly, in an AR lighting estimation example, if the input images to the model typically have a sky (e.g., in an outdoor image) or a ceiling (e.g., in an indoor image) in an upper portion of the input image, the model can be configured to be unlikely to sunlight coming from the lower areas (e.g., lower hemisphere, lower half, etc.), which may represent the natural occurrence and/or source of sunlight in the real world.

In some implementations, the systems described herein may track approximate joint coordinates (e.g., in a hand or body) in a two-dimensional image. The approximate joint coordinates can be used to properly align particular body parts in the image. For example, the systems described herein may ensure that images provided to a neural network include upright images (e.g., hands that are above the feet, shoulders below the head, knees above the feet, etc.)

In some implementations, the systems described herein can perform gravity alignment on images to ensure that each image is provided to the neural network in an upright position. The gravity alignment of imagery may use the tracking stack associated with a computing device to assist computer vision tasks that utilize neural networks such that the networks are trained using upright images. The gravity alignment can be performed to benefit computer vision tasks for applications that benefit from receiving an input image with a uniformly defined upward, downward, or other directional assessment of an image. For example, gravity alignment may provide computer vision benefit for tasks that include any or all of facial feature tracking (e.g., locating facial features in an image), face detection (e.g., locating a face in an image), body detection (e.g., locating a body in an image), body pose estimation (e.g., locating joint locations in an image), hand pose estimation and/or hand tracking (e.g., locating hand joint locations in an image), lighting estimation, surface normal estimation (e.g., estimating surface normals for each point in an image), general object detection (i.e., location specific objects in an image, e.g. "find the chair"), object classification (e.g., determining whether this object a chair, etc.), semantic segmentation (e.g., determining if an image pixel represent part of a table, etc.), body segmentation (e.g., determining if an image pixel represent part of a person), head segmentation (e.g., determining if an image pixel represent part of a person's head), hand segmentation (e.g., determining if an image pixel represent part of a person's hand), monocular 3D depth estimation (e.g., determining a depth of a pixel without direct measurement, etc.).

FIG. 1 illustrates an example Augmented Reality (AR) scene 100 captured with various lighting characteristics, according to example implementations. The scene 100 may be captured by a rear-facing camera of a computing device 102 and provided by an AR application 104. In this example, a user 106 may be accessing a camera mode that provides software and algorithms capable of enabling the user 106 to generate and place AR content around captured images (e.g., live and real time). The computing device 102 can utilize a tracking system 108, training data 110, neural networks 112, lighting engine 114, and face tracking software 116 to access the AR environment and place AR content. For example, the computing device 102 can detect device orientation during capture of scene 100 using tracking system 108. The detected device 102 orientation can be used to improve lighting estimates generated using the lighting engine 114, training data 110, and neural networks 112, for example. In addition, the detected device 102 orientation can be used to improve face tracking estimates generated using face tracking software 116.

As shown in FIG. 1, the user 106 captured scene 100 holding the computing device 102 at a particular angle (rotation, orientation, etc.). The angle may be used to determine how to rotate particular images when providing such images to a neural network 112, for example, to determine lighting estimates, movement estimates, face tacking estimates, etc. In this example, the user 106 may capture content by twisting the device 102 rightward (or leftward) from a perpendicular y-axis, as shown by arrow 120. The systems described herein may determine the camera pose changes and/or device pose changes associated with the user and/or device 202 in order to properly capture and render the user (in a front-facing camera view) and any VR and/or AR content associated with the user in the camera feed (from a front-facing camera view and/or a rear-facing camera view. Similarly, the systems described herein may determine pose changes associated with user or mobile device movement in a direction associated with z-axis 122 and/or x-axis 124.

In some implementations, the detected device orientation during capture of scene 100 can be used with face tracking software 116 to detect an upright-face for a front camera onboard the computing device 102, for example. The tracking system 108 can determine movements (i.e., position changes) of the device 102 to ascertain device orientation changes in order to determine an upright direction (e.g., gravity aligned) for a face depicted in a captured image.

In some implementations, the systems and techniques described herein provide a solution to lighting AR images and scenes using a motion tracking stack (e.g., representing movement changes over time for a device) and an Inertial Measurement Unit (IMU) sensor of a computing device (e.g., a mobile phone) executing an AR session. For example, the systems and techniques can determine realistic lighting for images and scenes by using such sensors and motion tracking to detect how (or if) to rotate images captured by one or more image sensing devices onboard the computing device before feeding the images to neural networks. This may be performed, for example, on live camera feed to ensure that the input images are gravity aligned with a detected ceiling/sky being upward in the image.

For training the neural networks 112, a number of computing device (e.g., mobile phone) videos can be captured to provide training data. In general, the videos and/or images are captured in a portrait orientation where the computing device is held with a bottom edge parallel to the ground associated with a user capturing the videos and/or images. When triggering live machine learning inference for a lighting estimation during an AR session using the computing device, holding the computing device in a landscape orientation (e.g., the bottom edge of the computing device is perpendicular to the ground), the estimated lighting result may not be accurate or realistic for the content in the scene. The lighting engine 114, face tracking software 116, and tracking system 108 may correct such estimated lighting by inferring landscape-based imagery from portrait-based imagery. In addition, the computing device 102 can trigger a gravity-based alignment for captured content to ensure that the content is oriented properly before being provided to the neural networks 112. For example, the computing device 102 can determine whether a rotation of the content is to be performed and if so, to what degree the content is to be rotated to ensure that proper lighting and/or tracking is maintained when rendering content on device 102.

Thus, the systems described herein may use such determinations and rotations to ensure that accurate training data 110 is used to train a neural network 112. In some implementations, accurate training data 110 may be defined as data that matches a particular device orientation, sensor orientation, and/or image orientation, etc. For example, the systems described herein may rely upon portrait-based imagery being properly indicated as upright. In addition, the systems described herein may simulate landscape-based imagery and configure such imagery to be provided to the neural network 112 in the system-expected upright orientation.

During an AR session, an AR sensing stack may be used to determine when and how to rotate a current image from a live camera feed in order to make sure such an image is provided to the neural network 112 as an upright image. The systems may then apply an inverse rotation to the predicted lighting, so that the estimated lighting is output in alignment with the physical camera coordinates that captured the image.

Figure 2:
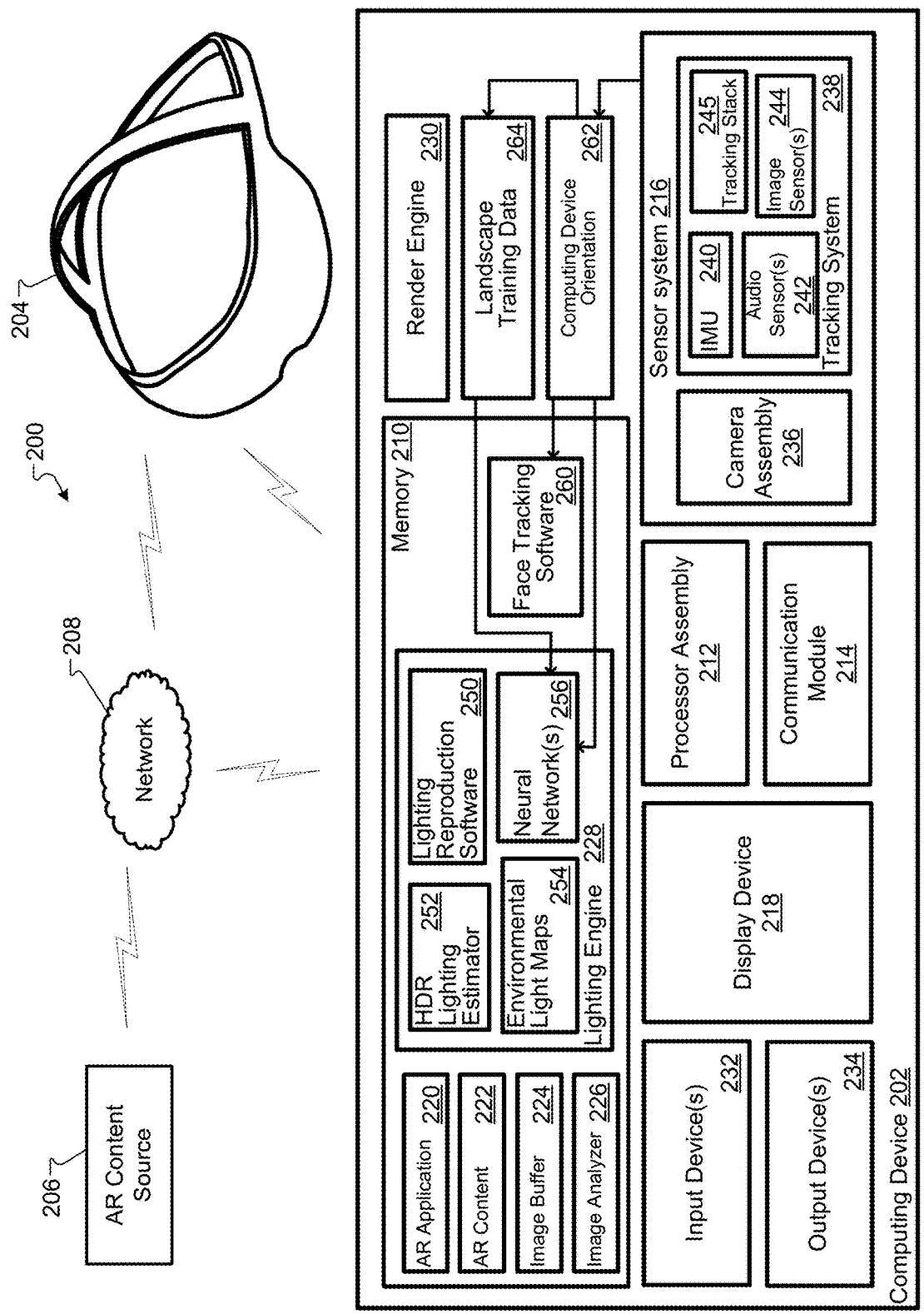
FIG. 2 is a block diagram of an example computing device with framework for determining what data to use to estimate a screen orientation for images presented in an AR experience, according to example implementations.

FIG. 2 is a block diagram of an example computing device 202 with framework for determining what data to use to estimate a screen orientation for images presented in an AR experience, according to example implementations. In some implementations, the framework may be used to determine what data to use to estimate a screen orientation for detecting a face and/or generating a lighting estimation for an AR experience.

In operation, the systems and techniques described herein may provide a mechanism to use machine learning to estimate high dynamic range (HDR) omnidirectional (360 degree) lighting/illumination to use for lighting and rendering virtual content into real-world scenes, for AR environments, and/or other compositing applications. The systems and techniques described herein can also determine particular device orientation during capture of an image and may then generate a lighting estimate and face tracking aspects to render a scene with the lighting estimate and face tracking aspects, according to the determined device orientation.

In some implementations, the system 200 may be used to generate lighting estimations for AR, VR, and/or MR environments. In general, the computing device (e.g., a mobile device, a tablet, a laptop, an HMD device, AR glasses, a smart watch, etc.) 202 can generate the lighting conditions to illuminate an AR scene. In addition, the device 202 can generate the AR environment for a user of the system 200 to trigger rendering of the AR scene with the generated lighting conditions on device 202, or another device. In some implementations, the system 200 includes the computing device 202, a head-mounted display (HMD) device 204 (e.g., AR glasses, VR glasses, etc.), and an AR content source 206. Also shown is a network 208 over which the computing device 202 may communicate with the AR content source 206. In some implementations, the computing device 202 is a pair of AR glasses (or other HMD device).

The computing device 202 includes memory 210, a processor assembly 212, a communication module 214, a sensor system 216, and a display device 218. The memory 210 may include an AR application 220, AR content 222, an image buffer 224, an image analyzer 226, a lighting engine 228, and a render engine 230. The computing device 202 may also include various user input devices 232 such as one or more controllers that communicate with the computing device 202 using a wireless communications protocol. In some implementations, the input device 232 may include, for example, a touch input device that can receive tactile user inputs, a microphone that can receive audible user inputs, and the like. The computing device 202 may also one or more output devices 234. The output devices 234 may include, for example, a display for visual output, a speaker for audio output, and the like.

The computing device 202 may also include any number of sensors and/or devices in sensor system 216. For example, the sensor system 216 may include a camera assembly 236 and a 3-DoF and/or 6-DoF tracking system 238. The tracking system 238 may include (or have access to), for example, light sensors, IMU sensors 240, audio sensors 242, image sensors 244, distance/proximity sensors (not shown), positional sensors (not shown), and/or other sensors and/or different combination(s) of sensors. Some of the sensors included in the sensor system 216 may provide for positional detection and tracking of the device 202. Some of the sensors of system 216 may provide for the capture of images of the physical environment for display on a component of a user interface rendering the AR application 220.

The computing device 202 may also include a tracking stack 245. The tracking stack may represent movement changes over time for a computing device and/or for an AR session. In some implementations, the tracking stack 245 may include the IMU sensor 240 (etc. gyroscopes, accelerometers, magnetometers). In some implementations, the tracking stack 245 may perform image-feature movement detection. For example, the tracking stack 245 may be used to detect motion by tracking features in an image. For example, an image may include or be associated with a number of trackable features that may be tracked from frame to frame in a video including the image, for example. Camera calibration parameters (e.g., a projection matrix) are typically known as part of an onboard device camera and thus, the tracking stack 245 may use image feature movement along with the other sensors to detect motion. The detected motion may be used to generate gravity-aligned images for provision to neural networks 256, which may use such images to further learn and provide lighting, additional tracking, or other image changes.

The computing device 202 may also include face tracking software 260. The face tracking software 260 may include (or have access to) one or more face cue detectors (not shown), smoothing algorithms, pose detection algorithms, and/or neural networks 256. The face cue detectors may operate on or with one or more cameras assemblies 236 to determine a movement in the position of particular facial features or a head of the user. For example, the face tracking software 260 may detect or obtain an initial three-dimensional (3D) position of computing device 202 in relation to facial features (e.g., image features) captured by the one or more camera assemblies 236. For example, one or more camera assemblies 236 may function with software 260 to retrieve particular positions of computing device 202 with respect to the facial features captured by camera assemblies 236. In addition, the tracking system 238 may access the onboard IMU sensor 240 to detect or obtain an initial orientation associated with the computing device 202.

The face tracking software 260 can detect and/or estimate a particular computing device orientation 262 (e.g., screen orientation) for device 202 during capture of images in order to detect an upright-face in a scene, for example. The computing device orientation 262 may be used to determine whether or not to rotate captured images in the detected and/or estimated screen orientation and by how much to rotate such images.

In some implementations, the sensor system 216 may detect computing device 202 (e.g., a mobile phone device) orientation during capture of an image. The detected computing device orientation 262 can be used as input in order to modify captured image content to ensure upward alignment (e.g., gravity-based alignment) of the captured image content before such content is provided to the neural network 256 for lighting estimation (with lighting reproduction software 250) and/or face tracking (with face tracking software 260, for example. The gravity alignment process may detect a specific rotation of degrees of the computing device and may correct images in order to provide both portrait and landscape-based images with realistic and accurate illumination and tracking.

In some implementations, the computing device orientation 262 may be used to generate landscape training data 264 for the neural networks 256 used by lighting engine 228. The landscape training data 264 may be a cropped and padded version of an originally captured portrait based image.

In some implementations, the computing device 202 is a mobile computing device (e.g., a smart phone) which may be configured to provide or output AR content to a user via the HMD 204. For example, the computing device 202 and the HMD 204 may communicate via a wired connection (e.g., a Universal Serial Bus (USB) cable) or via a wireless communication protocol (e.g., any Wi-Fi protocol, any Bluetooth protocol, Zigbee, etc.). Additionally, or alternatively, the computing device 202 is a component of the HMD 204 and may be contained within a housing of the HMD 204.

The memory 210 can include one or more non-transitory computer-readable storage media. The memory 210 may store instructions and data that are usable to generate an AR environment for a user.

The processor assembly 212 includes one or more devices that are capable of executing instructions, such as instructions stored by the memory 210, to perform various tasks associated with generating an AR, VR, and/or MR environment. For example, the processor assembly 212 may include a central processing unit (CPU) and/or a graphics processor unit (GPU). For example, if a GPU is present, some image/video rendering tasks, such as shading content based on determined lighting parameters, may be offloaded from the CPU to the GPU.

The communication module 214 includes one or more devices for communicating with other computing devices, such as the AR content source 206. The communication module 214 may communicate via wireless or wired networks, such as the network 208.

The IMU 240 detects motion, movement, and/or acceleration of the computing device 202 and/or the HMD 204. The IMU 240 may include various different types of sensors such as, for example, an accelerometer, a gyroscope, a magnetometer, and other such sensors. A position and orientation of the HMD 204 may be detected and tracked based on data provided by the sensors included in the IMU 240. The detected position and orientation of the HMD 204 may allow the system to in turn, detect and track the user's gaze direction and head movement. Such tracking may be added to a tracking stack that may be polled by the lighting engine 228 to determine changes in device and/or user movement and to correlate times associated to such changes in movement. In some implementations, the AR application 220 may use the sensor system 216 to determine a location and orientation of a user within a physical space and/or to recognize features or objects within the physical space.

The camera assembly 236 captures images and/or videos of the physical space around the computing device 202. The camera assembly 236 may include one or more cameras. The camera assembly 236 may also include an infrared camera.

The AR application 220 may present or provide the AR content 222 to a user via the HMD 204 and/or one or more output devices 234 of the computing device 202 such as the display device 218, speakers (e.g., using audio sensors 242), and/or other output devices (not shown). In some implementations, the AR application 220 includes instructions stored in the memory 210 that, when executed by the processor assembly 212, cause the processor assembly 212 to perform the operations described herein. For example, the AR application 220 may generate and present an AR environment to the user based on, for example, AR content, such as the AR content 222 and/or AR content received from the AR content source 206.

The AR content 222 may include AR, VR, and/or MR content such as images or videos that may be displayed on a portion of the user's field of view in the HMD 204 or on a display 218 associated with the computing device 202, or other display device (not shown). For example, the AR content 222 may be generated with lighting (using lighting engine 228) that substantially matches the physical space in which the user is located. The AR content 222 may include objects that overlay various portions of the physical space. The AR content 222 may be rendered as flat images or as three-dimensional (3D) objects. The 3D objects may include one or more objects represented as polygonal meshes. The polygonal meshes may be associated with various surface textures, such as colors and images. The polygonal meshes may be shaded based on various lighting parameters generated by the AR content source 206 and/or lighting engine 228.

The AR application 220 may use the image buffer 224, image analyzer 226, lighting engine 228, and render engine 230 to generate images for display via the HMD 204 based on the AR content 222. For example, one or more images captured by the camera assembly 236 may be stored in the image buffer 224. The AR application 220 may determine a location to insert content. For example, the AR application 220 may prompt a user to identify a location for inserting the content and may then receive a user input indicating a location on the screen for the content. The AR application 220 may determine the location of the inserted content based on that user input. For example, the location for the content to be inserted may be the location indicated by the user accessing the AR experience. In some implementations, the location is determined by mapping the location indicated by the user to a plane corresponding to a surface such as a floor or the ground in the image (e.g., by finding a location on the plane that is below the location indicated by the user). The location may also be determined based on a location that was determined for the content in a previous image captured by the camera assembly (e.g., the AR application 220 may cause the content to move across a surface in that was identified within the physical space captured in the image).

The image analyzer 226 may then identify a region of the image stored in the image buffer 224 based on the determined location. The image analyzer 226 may determine one or more properties, such as brightness (or luminosity), hue, and saturation, of the region. In some implementations, the image analyzer 226 filters the image to determine such properties. For example, the image analyzer 226 may apply a mipmap filter (e.g., a trilinear mipmap filter) to the image to generate a sequence of lower-resolution representations of the image. The image analyzer 226 may identify a lower resolution representation of the image in which a single pixel or a small number of pixels correspond to the region. The properties of the region can then be determined from the single pixel or the small number of pixels. The lighting engine 228 may then generate one or more light sources or environmental light maps 254 based on the determined properties. The light sources or environmental light maps can be used by the render engine 230 to render the inserted content or an augmented image that includes the inserted content.

In some implementations, the image buffer 224 is a region of the memory 210 that is configured to store one or more images. In some implementations, the computing device 202 stores images captured by the camera assembly 236 as a texture within the image buffer 224. Alternatively or additionally, the image buffer 224 may also include a memory location that is integral with the processor assembly 212, such as dedicated random access memory (RAM) on a GPU.

In some implementations, the image analyzer 226, lighting engine 228, and render engine 230 may include instructions stored in the memory 210 that, when executed by the processor assembly 212, cause the processor assembly 212 to perform operations described herein to generate an image or series images that are displayed to the user (e.g., via the HMD 204) and are illuminated using lighting characteristics that are calculated using the neural networks 256 described herein.

The system 200 may include (or have access to) one or more neural networks 256 (e.g., neural network 112). The neural networks 256 may utilize an internal state (e.g., memory) to process sequences of inputs, such as a sequence of a user moving and changing a location when in an AR experience. In some implementations, the neural networks 256 may utilize memory to process lighting aspects and to generate lighting estimates for an AR experience.

In some implementations, the neural networks 256 may be recurrent neural networks (RNNs). In some implementations, the RNNs may be deep RNNs with multiple layers. For example, the RNNs may include Long Short Term Memory (LSTM) architecture or Gated Recurrent Unit (GRU) architecture. In some implementations, the system 200 may use both LSTM and GRU architectures based on determining which architecture reduces errors and/or latency. In some implementations, the neural network 256 may be a convolutional neural network (CNN). In some implementations, the neural network may be a deep neural network. As used herein, any number or type of neural network may be used to implement particular lighting estimates and/or face locations for scenes.

The neural networks 256 may include detectors that operate on images to compute, for example, lighting estimates and/or face locations to model predicted lighting and/or locations of the face as the face/user moves in world space. In addition, the neural networks 256 may operate to compute lighting estimates and/or face locations several timesteps into the future. The neural networks 256 may include detectors that operate on images to compute, for example, device locations and lighting variables to model predicted lighting for a scene based on device orientation, for example.

The neural networks 256 may make use of omnidirectional lights or light probe images obtained from prior imaging and may use such content for generating particular environmental light maps 254 (or other output images and lighting) from the neural networks 256.

In some implementations, a two-step methodology, where the neural networks 256 may be a light estimation network (also referred to as deep neural network, convolutional neural network, etc.) predicts a (clipped) light probe image directly (the loss function may be the squared difference or absolute difference between the clipped input probe image and the net output), then the directional light values are obtained by solving a linear system with constrained least squares.

Captured images and the associated lighting may be used for training the neural networks 256. The training data (e.g., captured images) may include LDR images of one or more light probes (not shown) with measured or known bidirectional reflectance distribution function (BRDF) under various (e.g., different) lighting conditions. The appearance of the gray sphere is a convolved version of the environmental lighting. The probe image may be further processed into HDR lighting coefficients by solving a linear system. In some implementations, the types of training data that can be used are general LDR panoramas, of which many more are available.

In general, any number of lighting representations may be used for real time graphics applications. In some implementations, for example, ambient light may be used for evaluation and AR development support environment ambient light estimation. In some implementations, for example, directional light may be used for evaluation and to function with shadow mapping and approximation for dominant and distant light sources (e.g. the Sun). In some implementations, for example, environmental light mapping may be used. This stores direct 360 degree lighting information. Several typical parameterizations include cube mapping, equirectangular, equiangular mapping, or orthographic projection may be used. In some implementations, spherical harmonics may be used, for example, for modeling low frequency illumination and as precomputed radiance transfer for fast integration.

The lighting engine 228 may be used by device 202 to generate one or more light sources for an AR, VR, and/or MR environment. The lighting engine 228 includes lighting reproduction software 250 that may utilize and/or generate an HDR lighting estimator 252, environmental light maps 254, and neural networks 256. The lighting reproduction software 250 may execute locally on computing device 202, remotely on a computer of one or more remote computer systems (e.g., a third party provider server system accessible via network 208), a cloud network, or on a combination of one or more of each of the preceding.

The lighting reproduction software 250 can present a user interface (UI) for displaying related information, such as controls, calculations, and images on a display device 218 of computing device 202, for example. The lighting reproduction software 250 is configured to analyze, process, and manipulate data that is generated by the lighting estimation techniques described herein. The lighting reproduction software 250 may be implemented to automatically compute, select, estimate, or control various facets of the disclosed lighting estimation approaches, such as the functions used for photographing color charts and/or handling or generating environmental light maps 254.

The neural networks 256 may represent a light estimation network that is trained to estimate HDR lighting using HDR lighting estimator 252 from at least one LDR background image (not shown). The background image may be from a camera view of the computing device 202, for example. In some implementations, the training example may include a background image, an image of a light probe (e.g., sphere) in the same environment, and a bidirectional reflectance distribution function (BRDF) of the light probe, as described below in detail.

The framework illustrated in FIG. 2 supports using a plurality of light probes (not shown) of different materials (e.g., shiny, dull, etc. light probe materials) to train one or more of the neural networks 256. The shiny light probe materials capture high frequency information which may include clipped pixel values in the images. The duller light probe materials capture low information without any clipping. In some implementations, these two sets of data may complement each other so that the neural networks 256 can estimate HDR lighting without HDR training data.

The AR application 220 may update the AR environment based on input received from the camera assembly 236, the IMU 240, and/or other components of the sensor system 216. For example, the IMU 240 may detect motion, movement, and/or acceleration of the computing device 202 and/or the HMD 204. The IMU 240 may include various different types of sensors such as, for example, an accelerometer, a gyroscope, a magnetometer, and other such sensors. A position and orientation of the HMD 204 may be detected and tracked based on data provided by the sensors included in the IMU 240. The detected position and orientation of the HMD 204 may allow the system to in turn, detect and track the user's position and orientation within a physical space. Based on the detected position and orientation, the AR application 220 may update the AR environment to reflect a changed orientation and/or position of the user within the environment.

Although the computing device 202 and the HMD 204 are shown as separate devices in FIG. 2, in some implementations, the computing device 202 may include the HMD 204. In some implementations, the computing device 202 communicates with the HMD 204 via a wired (e.g., cable) connection and/or via a wireless connection. For example, the computing device 202 may transmit video signals and/or audio signals to the HMD 204 for display for the user, and the HMD 204 may transmit motion, position, and/or orientation information to the computing device 202.

The AR content source 206 may generate and output AR content, which may be distributed or sent to one or more computing devices, such as the computing device 202, via the network 208. In some implementations, the AR content 222 includes three-dimensional scenes and/or images. Additionally, the AR content 222 may include audio/video signals that are streamed or distributed to one or more computing devices. The AR content 222 may also include all or a portion of the AR application 220 that is executed on the computing device 202 to generate 3D scenes, audio signals, and/or video signals.

The network 208 may be the Internet, a local area network (LAN), a wireless local area network (WLAN), and/or any other network. A computing device 202, for example, may receive the audio/video signals, which may be provided as part of AR content in an illustrative example implementation, via the network 208.

The AR, VR, and/or MR systems described herein can include systems that insert computer-generated content into a user's perception of the physical space surrounding the user. The computer-generated content may include labels, textual information, images, sprites, and three-dimensional entities. In some implementations, the content is inserted for entertainment, educational, or informational purposes.

An example AR, VR, and/or MR system is a portable electronic device, such as a smartphone, that includes a camera and a display device. The portable electronic device may capture images using the camera and show images on the display device that include computer-generated content overlaid upon the images captured by the camera.

Another example AR, VR, and/or MR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR, VR, and/or MR system includes an HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

Although many examples described herein relate to AR systems inserting and/or compositing visual content into an AR environment, content may be inserted using the techniques described herein in other systems too. For example, the techniques described herein may be used to insert content into an image or video.

In general, the systems and techniques may be carried on a mobile electronic device, such as computing device 202. However, other electronic devices housing or associated with one or more cameras and/or images sensors may be used to carry out the techniques described herein. In some implementations, tracking sensors and an associated tracking stack may also be used as input to carry out lighting estimation techniques.

Figure 3:
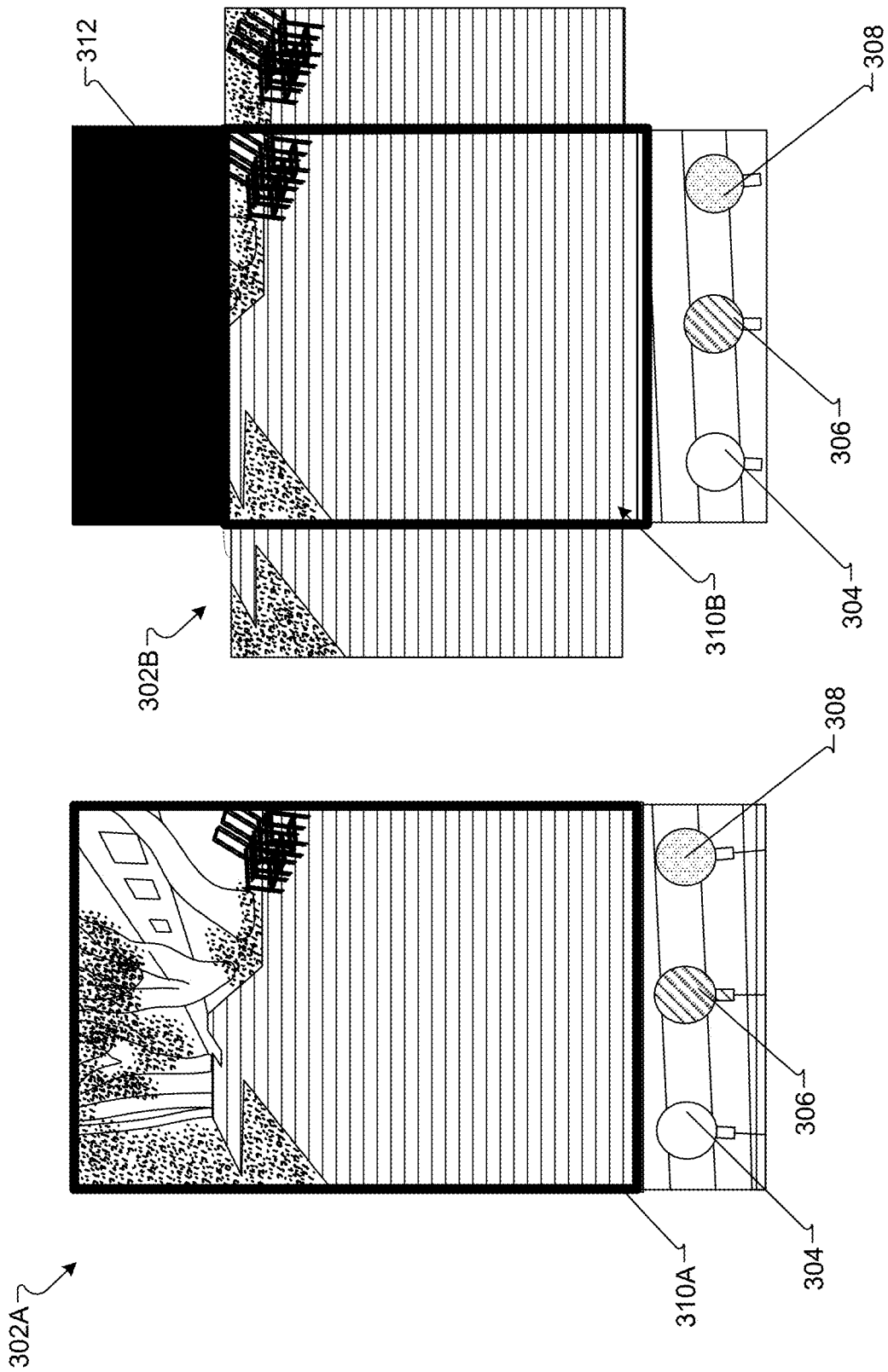
FIGS. 3A-3B illustrate an example of generating landscape image content from captured image content, according to example implementations.

FIGS. 3A-3B illustrate an example of generating landscape image content from captured image content, according to example implementations. The generated landscape image content may be provided to the neural networks 256 as landscape training data 264, for example.

FIG. 3A illustrates an image 302A captured in a portrait-based orientation. The image 302A may be a single image/scene or may be video. A number of different reflective spheres 304, 306, and 308 may be used during capture of the image 302A. The image 302A may be processed by computing device 202 to determine device orientation, determine image orientation, and to generate output with adjustments for differences in such orientations. The resulting outputs may be provided to a neural network to generate lighting estimates and/or face tracking tasks. In some implementations, such outputs may be used as landscape training data 264 for the neural networks 256, for example. In general, the training data for neural networks 256 may include the captured content (in portrait mode) and landscape content generated using the portrait-based captured content, as described in detail below.

The landscape training data 264 may include modified versions of videos and/or images captured using the various reflective spheres (e.g., spheres 304, 306, and 308) placed within the camera's field of view. Such captured content may leave the background imagery un-occluded, while leveraging that materials with diverse reflectance functions reveal different lighting cues in a single exposure. The landscape training data 264 may be used to train a deep convolutional neural network (e.g., neural network 256) to regress from the un-occluded part of the LDR background image to HDR lighting by matching the LDR ground truth sphere images to those rendered with the predicted illumination using image-based relighting for landscape-oriented content.

For example, if image 302A is to be illuminated and rendered for display to a user of computing device 202, the system may use the captured content 310A to train the neural network 256 to generate lighting and/or other tracking for realistically lighting and rendering content in a scene on device 202. Such a method may be used if the system 216 detects that the computing device 202 orientation is in gravity alignment with the portrait-based capture mode used to capture content 310A. In such examples, the system may access image 302A and crop the image to remove spheres 304, 306, and 308. The remaining content 310A may be used to generate lighting estimates for a scene that the user over device 202 may access.

Because the lighting engine 228 and the face tracking software 260 expect to receive image content that is gravity aligned (e.g., in an upright position where sky and/or ceiling are in an upper half of the image content, or eyes located above lips in the image in the face tracking case), the system may determine that portrait-based captures are gravity aligned and as such, content 310A may be utilized to generate lighting estimates or tracked facial features without rotational modification.

However, if the system determines that a particular device orientation does not match particular image content orientations, the system may correct for the mismatch. For example, if the system detects that image content is being accessed for an AR session in a landscape mode (or within a threshold angle of landscape mode), the system can adjust image content to ensure lighting estimates, tracking, and placement of content within the AR environment are realistically rendered for the AR session (e.g., the image or scene in the AR session).

For example, if a user used a computing device in a landscape orientation to access an AR session, the sensor system 216 and the lighting engine 228 can function together to generate landscape-based content for properly illuminating content accessed in the AR session. The device 202 can modify portrait-based captured content to generate landscape-based content. For example, the computing device 202 can generate landscape training data 264 using content 310A by cropping out the same spheres 304, 306, and 308, but may additionally crop (e.g., and mask) an upper portion 312 of the content to generate content 310B. The upper portion 312 may then be padded with white, gray, black or other color of pixels. Such a mask may ensure that an image aspect ratio is maintained for both captured portrait images and generated landscape images.

At inference, the device 202 can retrieve the landscape image 302B and generate a new image for training. For example, the device 202 can retrieve landscape (e.g., rotated from portrait) image 302B, crop an interior portion (e.g., 310B), pad the portion 310B with pixels 312 and then may send the generated image (in the same resolution as the portrait image 310A) to the neural network 256.

In addition, the tracking system 238 may have detected at inference that the device 202 is in a landscape orientation and as such, when a lighting estimation is predicted from engine 228, the device 202 can provide a lighting prediction rotated at about 90 degrees from where the actual image sensor 244 (e.g., camera sensor) is aligned. Thus, the sensor output is used to pre-rotate the input image, crop out a left portion and right portion of the image content 302B and to un-rotate the predicted lighting estimate back to an orientation of image sensor 244 of the device 202. In operation, device 202 may utilize a sensor stack that is part of a tracking stack such that device movement and user movement can also be considered when generating lighting and/or tracking updates that may be represented in a rendered scene.

In some implementations, an input image, such as image 302A may be used to generate four cropped versions that represent four different rotations that a camera may be moved in order to capture content with the forward or rear-facing cameras. In such an example, a tracking stack may not be utilized.

In some implementations, the rotations and corrections described herein may not be performed if, for example, the system determines that a device has not been moved further than a threshold level. Similarly, a particular image may not be modified if the device 202 determines that a prior state of the device and/or image suffices. Thus, no change may be performed to rotate images, move content, and/or update lighting.

However, if instead the device 202 determines a movement from landscape to portrait mode or visa versa, the device 202 may trigger a reset of a last state of the device to trigger new updates in tracking and/or lighting based on the detect change in device orientation or other movement.

FIG. 4 is an example illustrating a computing device orientation map and translation of such orientations used to perform gravity-based alignment, according to example implementations. The device orientation map includes a detected phone (e.g., computing device 202) orientation column 402, a VGA image column 404, a gravity alignment angle column 406, a VGA image after rotation column 408, and a display rotation column 410.

The system 200 (e.g., on computing device 202) can detect a phone orientation using sensors (e.g., IMU 240, images sensors 244, camera assembly 236, etc.) and/or sensor system 216, in general. The device orientation may be detected during capture of content. For example, a 3-DoF and/or 6-DoF device pose can be detected by tracking system 238 during capture of image content. The device pose and/or camera pose may be used to trigger orientation rotations to improve output used for rendering images captured at the detected orientation of device 202. The improved output may pertain to improved accuracy and render of lighting estimations for captured content.

In operation, the sensor system 216 may detect computing device (e.g., mobile phone device) orientation 262 during capture of an image. The detected computing device orientation 262 can be used to modify captured image content to ensure upward alignment (e.g., gravity-based alignment) of the captured image content before such content is provided to the neural network 256 for lighting estimation (with lighting reproduction software 250) and/or face tracking (with face tracking software 260, for example.

The sensor system 216 may detect a specific rotation of degrees of the computing device 202. For example, the system 216 may detect if the computing device 202 is tilted and or rotated at 0 degrees, 90 degrees, 180 degrees, and 270 degrees from a ground plane (e.g., parallel to the z-axis 122). In some implementations, the system 216 can detect varying degrees of tilt and or rotation in increments of about ten degrees from the x-axis, y-axis, or z-axis and from zero to 360 degrees around any of such axes. For example, the system 216 may detect that the device 202 is rotated at plus or minus about ten degrees from 0 degrees, 90 degrees, 180 degrees, and 270 degrees from a ground plane (e.g., parallel to the z-axis 122). In some implementations, the system 216 can also determine pitch, yaw, and roll to incorporate tilting aspects of device 202.

As shown in FIG. 4, the system 216 may detect a device orientation of zero degrees, as shown by gravity alignment element 414 in which the device 202 is held in an upright vertical position with zero (or less then 10 degrees) tilt or rotation. Here, the system 216 may determine that content being captured may be used to generate landscape training data and/or landscape-based content. Because the image sensors 244 and camera assembly 236 may not recognize device orientation changes, the IMU 240 and/or other tracking sensors may determine device and/or camera pose in order to correct image content to an upright and gravity-aligned position, as indicated by gravity alignment elements 414, 418, and 420, for example. Thus, regardless of how the computing device 202 is held, the system 216 can determine an upright and gravity-aligned way of generating the images (e.g., scenes) for the neural networks 256 to ensure lighting estimations are accurately performed, which provides an advantage of generating and rendering realistic lighting when rendering the images (e.g., scenes).

In general, the device orientation may be at zero degrees if the device is held, during capture, to position an onboard camera 403 parallel to and above a bottom edge 205 of the computing device 202. In some implementations, the device orientation may still be considered as zero degrees within ten degrees of such a position clockwise (rotated clockwise from a normal to the edge 205), counterclockwise (rotated counterclockwise from a normal to the edge 205), forward (rotated from a normal to the edge 205), or backward (rotated from a normal to the edge 205).

Similarly, the device orientation may be detected to be about 270 degrees if the device is held, during capture, to position an onboard camera 403 parallel to and to the left of the bottom edge 205 of the computing device 102. In some implementations, the device orientation may still be considered as 270 degrees within ten degrees of such a position clockwise (rotated clockwise from a normal to the edge 205), counterclockwise (rotated counterclockwise from a normal to the edge 205), forward (rotated from a normal to the edge 205), or backward (rotated from a normal to the edge 205).

Similarly, the device orientation may be detected to be about 180 degrees if the device is held, during capture, to position an onboard camera 403 parallel to and below the bottom edge 205 of the computing device 102. In some implementations, the device orientation may still be considered as 180 degrees within ten degrees of such a position clockwise (rotated clockwise from a normal to the edge 205), counterclockwise (rotated counterclockwise from a normal to the edge 205), forward (rotated from a normal to the edge 205), or backward (rotated from a normal to the edge 205).

Similarly, the device orientation may be detected to be about 90 degrees if the device is held, during capture, to position an onboard camera 403 parallel to and to the right of the bottom edge 205 of the computing device 102. In some implementations, the device orientation may still be considered as 90 degrees within ten degrees of such a position clockwise (rotated clockwise from a normal to the edge 205), counterclockwise (rotated counterclockwise from a normal to the edge 205), forward (rotated from a normal to the edge 205), or backward (rotated from a normal to the edge 205).

If the system 216 determines the device 202 orientation is in a portrait position, but determines that captured content can be used to generate landscape-based training imagery, the system may determine that a captured image 401 is to be realigned (e.g., rotated counterclockwise) by about 90 degrees. For example, if system 216 indicates landscape-based image content can be generated, the system 216 may trigger a counterclockwise rotation of a captured image 401 by about 90 degrees, as indicated by gravity alignment element 418 to generate rotated image 416.

When the image content is provided to the neural network 256 for lighting estimation, the image 416 may be provided according to the phone orientation, as indicated by gravity alignment element 420. For example, the image 416 may be rotated by about 270 degrees counterclockwise and/or cropped and provided as input to the neural network 256 for use in generating lighting estimations. Upon completion of a lighting estimation, the lighting engine 228 may trigger rendering of the image content 420 using the lighting estimation and may trigger a realignment back to physical camera space coordinates (as shown by phone orientation 402). In such an example, the output image from the neural network may be rotated by the inverse of the gravity alignment angle 406 when rendered for display.

In another example, if the system 216 determines the device 202 orientation is in a landscape orientation, as indicated by gravity alignment element 422 and the content being captured is in the landscape (e.g., zero degrees and unrotated from the camera sensors, as indicated by gravity alignment element 424), the system 216 may determine that a captured image 426 will not benefit from rotation/realignment. For example, if system 216 indicates landscape-based image content is being captured and the device 202 is in the landscape position with a sky/ceiling indicated as upright in the capture, the system may retain the original capture and alignment used during capture, as indicated by gravity alignment element 428. Instead, the system 216 may crop (not shown) a center portion (e.g., a region of interest) of the captured content and may zero pad (with black pixels, white pixels, gray pixels, etc.) the landscape-based image in a top portion to ensure the image content is the same size as an image captured using a portrait-based orientation. When the image content is provided to the neural network 256 for lighting estimation, the image may be provided in the orientation captured and cropped and padded, as described above.

If the system 216 determines the device 202 orientation is inverted from upright (e.g., the camera is in the bottom portion of device 202), as indicated by gravity alignment element 430, but the content can be used to generate landscape training data, the system 216 may rotate the content 90 degrees, as indicated by image 426 and gravity alignment element 434. When the image content is provided to the neural network 256 for lighting estimation, the image 426 may be provided according to the device orientation, as indicated by gravity alignment element 436, which indicates a counterclockwise 90 degree rotation from content 432 to content 433. Upon completion of a lighting estimation, the lighting engine 228 may trigger rendering of the image content using the lighting estimation and may trigger a realignment back to physical camera space coordinates (as shown by phone orientation 402). In such an example, the output image from the neural network 256 may be rotated by the inverse of the gravity alignment angle 406.

In another example, if the system 216 determines the device 202 orientation is in a landscape orientation rotated clockwise from upright portrait orientation, as indicated by gravity alignment element 382) and the content 440 being captured is in the landscape (e.g., 180 degrees and rotated from the camera sensors, as indicated by gravity alignment element 442), the system may determine that a captured image 440 may be used to generate landscape-based training data for the neural network 256. Thus, the image 440 may be rotated (e.g., realigned) by about 180 degrees to ensure ceiling or sky is upward, for example, as shown by image 443 and gravity alignment element 444.

In addition, the system 216 may crop (not shown) a center portion (e.g., a region of interest) of the captured content 440 and may zero pad (with black pixels, white pixels, gray pixels, etc.) the landscape-based image 440 in a top portion to ensure the image content is the same size as an image captured using a portrait-based orientation. When the image content is provided to the neural network 256 for lighting estimation the image may be provided in the rotated orientation and cropped and padded, as described above. When the image content is to be rendered, an inverse rotation (e.g., −180 degrees) to the gravity aligned rotation (e.g., 180 degrees) may be performed to provide lighting and or face tracking aligned to the physical camera space.

While rear-facing camera 403 is described in the examples above, front-facing camera 450 may be substituted and used in the systems and techniques described herein to apply to content captured with the front-facing camera including users.

FIGS. 5A-5D illustrate an example of providing gravity-based alignment for face tracking in an AR experience, according to example implementations. The gravity-based alignment may ensure that input images provided to a neural network used in the face tracking are upright. For example, the face tracking software 260 may be used to determine which data to use to estimate a screen orientation and thus device orientation in order to detect an upright face captured by a front-facing camera on device 202, for example.

In some implementations, the gravity-based alignment for face tracking may be performed to ensure that images provided to neural networks 256 be provided in an upright manner in which the eyes are located above the mouth, for example. In such a determination, the screen orientation and/or the image content may be taken into account. For example, the tracking system 238 may determine a 3-DoF and/or 6-DoF device or camera pose. The pose may be used to estimate a current screen orientation in order to determine which orientation in which to provide training images to the neural networks 256.

For example, the sensor system 216 may determine a 3-DoF pose for device 202. If the pose is within a threshold level of a predefined normal vector defined from a surface, a new screen orientation may not be calculated. For example, if the computing device is facing up or down on a surface with a tilt of about 8 degrees to about 12 degrees from the surface, the system 216 may maintain a current screen orientation. If additional tilt or additional directional rotation is detected, the system 216 may generate a quantized rotation between a normal vector to the surface and the camera vector calculated from the 3-DoF pose, for example.

Referring to FIG. 5A, a user is shown in an image 502 captured by a front-facing camera 504 on a computing device 506A. The device 506A is shown in a portrait orientation aligned about a y-z axis (shown by y-axis 120 and z axis 122). The orientation of device 506A may be determined by tracking system 238. The face tracking software 260 may use the computing device orientation 262 of device 202 to ensure that captured image 502 is upright (i.e., with an upright face in which the eyes are above the mouth).

If the system 216 determines the device 202 orientation is zero degrees, but the content can be used to generate landscape imagery, the system may determine that the image 502 is to be realigned by about 270 degrees to ensure that the neural network using the image can appropriately track content to be displayed with the image in the AR session, for example and provide the content to be displayed in a location associated with the upright face of the user. The system may trigger a counter clockwise rotation of the captured image by about 270 degrees resulting in image 508. When the image content is provided to the neural network 256 for lighting estimation and/or face tracking, the rotated image 508 within the dotted lines may be cropped and rotated upright, as shown in image 510 before image 510 is provided to the neural network 256. Upon completion of a face tracking task, the face tracking software 260 may trigger rendering of the image content using the face tracking and may trigger a realignment back to physical camera space coordinates (as shown by device orientation of device 506A). In such an example, the output image from the neural network may be rotated by the inverse of the gravity alignment angle of 270 degrees.

As shown in FIG. 5B, the user may be accessing an AR experience on device 506B and using the camera to capture image content 512. The system 216 may determine that the device 506B is capturing content in a landscape mode. The content may not be rotated in such an example. Instead, the system 216 may crop a center portion 514 (e.g., a region of interest) of the captured content 512 and may zero pad (with black pixels, white pixels, gray pixels, etc.) the landscape-based image in a top portion 516 to ensure the image content is the same size as an image captured using a portrait-based orientation. When the image content is provided to the neural network 256 for face tracking, the image 518 may be provided in the orientation captured and cropped and padded, as described above.

Figure 5C:
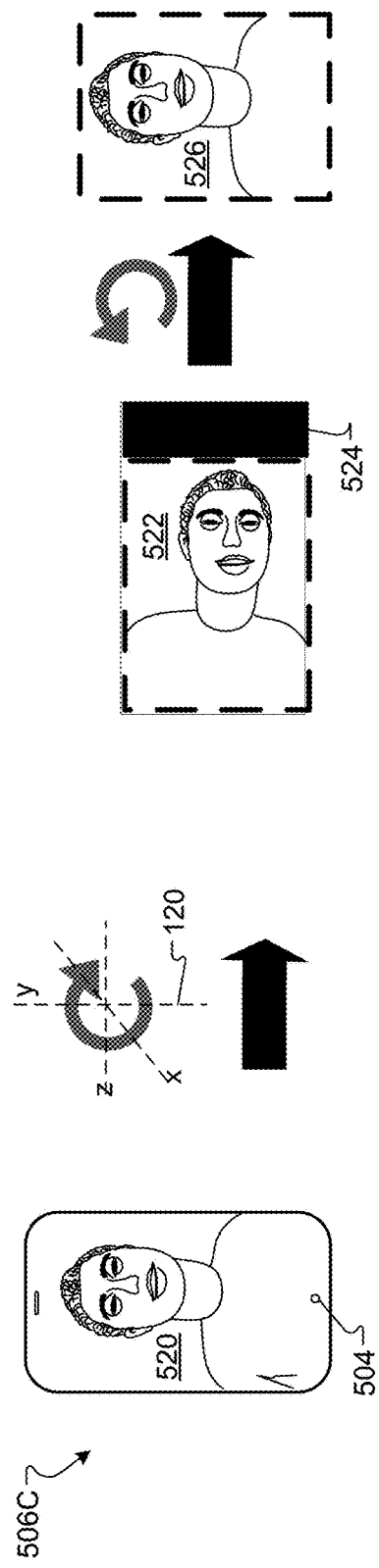

As shown in FIG. 5C, the system 216 may determine that a device 506C is capturing content in a portrait mode, but with the camera device in an inverted position to upright. For example, camera 504 is located in a lower portion of device 506C, rather than an upright position, as shown in device 506A. If the system 216 is to generate landscape oriented content using captured content 520 with device 506C in the inverted position, the system 216 may have to rotate the content 520 by 90 degrees clockwise, as shown by content 522. When the image content is provided to the neural network 256 for face tracking estimations, the image 522 may be cropped and padded, as shown by area 524 and may be reoriented counterclockwise by 90 degrees, as shown by image 526. Upon completion of a face tracking task, the face tracking software 260 may trigger rendering of the image content 526 using the face tracking and may trigger a realignment back to physical camera space coordinates shown by device 506C. In such an example, the output image from the neural network may be rotated by the inverse of the gravity alignment angle shown by rotated image 526.

Figure 5D:
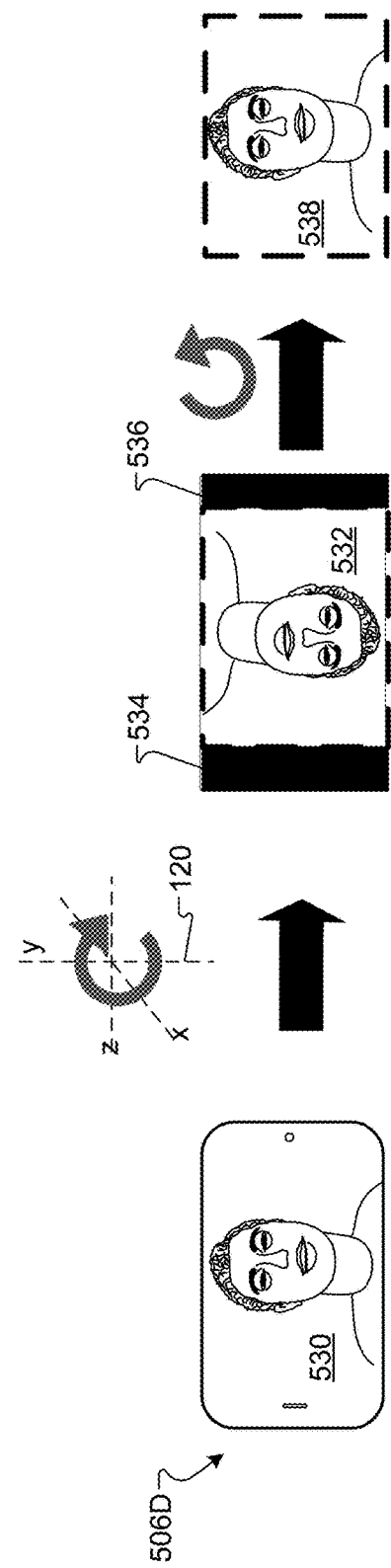

As shown in FIG. 5D, if the system 216 determines the device 506D is in a landscape orientation (rotated clockwise from upright portrait orientation as indicated by device 506A) and the content 530 being captured is in the landscape position (e.g., 180 degrees and rotated from the camera sensors), the system 216 may determine that a captured image 530 is to be rotated (e.g., realigned) by about 180 degrees to ensure ceiling or sky is upward, for example, as shown by rotated image 532. To generate additional landscape training data using image 532, the system 216 may crop a center portion 532 (e.g., a region of interest) of the captured content 530 and may zero pad (with black pixels, white pixels, gray pixels, etc.) the landscape-based image 532 in a side portion 534 and side portion 536 to ensure the image content 538 is the same size as an image captured using a portrait-based orientation when being provided to the neural networks 256. When the image content is provided to the neural network 256 for face tracking, the image 532 may be provided in the rotated orientation and cropped and padded to generate image 538, as described above. When the image content is to be rendered, an inverse rotation (e.g., −180 degrees from a normal to the ground plane) to the gravity aligned rotation (e.g., 180 degrees) may be performed to provide face tracking aligned to the physical camera space.

Figure 6:
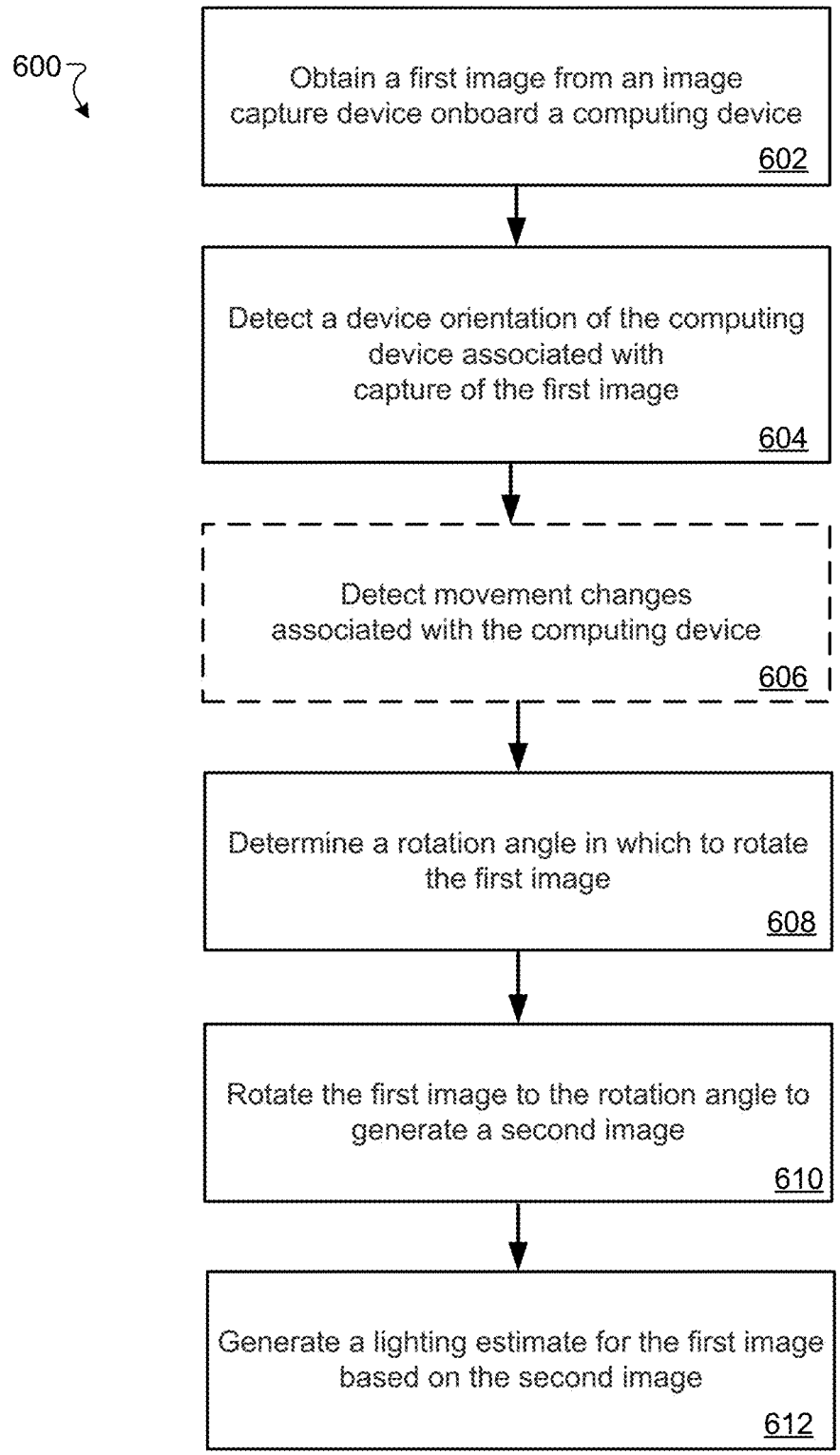
FIG. 6 is an example process to infer gravity alignment of image content, according to example implementations.

FIG. 6 is an example process 600 to infer gravity alignment of image content, according to example implementations. The process 600 is described with respect to an example implementation of the electronic device described in FIG. 2 and/or system 700, but it will be appreciated that the process 600 can be implemented by devices and systems having other configurations.

In short, the computing device 202 may incorporate determined orientation knowledge indicating an upright position for a given input image for use when tracking content (e.g., faces, objects, etc.) captured in an image and tracking other content around the faces, objects, etc. For example, for a facial feature tracker, the device 202 can determine if faces in an input image received at a model (e.g., neural network 256) are pre-rotated such that the eyes are above the nose mouth of a user, the model can learn the spatial relationship between different parts of the face, and can be configured to be unlikely to provide predictions in which eyes are below the mouth. Similarly, in an AR lighting estimation example, if the input images to the model typically have a sky (e.g., in an outdoor image) or a ceiling (e.g., in an indoor image) in an upper portion of the input image, the model can be configured to be unlikely to produce sunlight coming from the lower areas (e.g., lower hemisphere, lower half, etc.), which may represent the natural occurrence and/or source of sunlight in the real world.

At block 602, the process 600 may include obtaining, at a processor, a first image from an image capture device onboard a computing device. For example camera assembly 236 may use image sensors 244 to capture any number of images for computing device 202. In addition, any number of processors from processor assembly 212 or another onboard device in computing device 202 may function as a processor throughout process 600. In some implementations, the at least one image includes a live camera image feed which functions to generate a plurality of images. In some implementations, the at least one sensor includes a tracking stack associated with tracked features captured in the live camera image feed. For example, the sensor system 216 may capture and assess one or more images that take into account the tracking stack 245 when camera assembly 236 is capturing video in order to generate gravity aligned images for presentation to the neural network 256.

At block 604, the process 600 includes detecting, using the processor and at least one sensor, a device orientation of the computing device executing an AR session and associated with capture of the first image. For example, the IMU 240 may determine device orientation, such as portrait, landscape, inverse portrait, or inverse landscape and/or another angle between portrait, landscape, inverse portrait, and/or inverse landscape. The orientation of device 202 may be based on 3-DoF sensor data that indicates a device pose or location in space for the device 202. In some implementations, the detected device orientation is obtained during the AR session operating on the computing device 202. In some implementations, images may be generated and/or rotated to match a capture orientation associated with previously captured training data. For example, if the previously captured training data is detected as portrait-oriented, content that is oriented in a different manner may be rotated to match the portrait-oriented previously captured training data.

At block 606, the process 600 includes detecting, using the processor and the at least one sensor, movement changes associated with the computing device. For example, the movement changes may be associated with a tracking stack generated by device 202 using IMU measurements and/or other sensor system 216 tracking and/or measurements. In some implementations, the movement changes are detected in real time as a user moves or rotates/tilts device 202 during image capture. In some implementations, the first image includes (or represents) a live camera image feed generating a plurality of images to be gravity aligned, for example. The plurality of images may be continuously aligned based on the detected movement changes (in the tracking stack) associated with the computing device 202, for example. For example, the at least one sensor may be an IMU sensor of the computing device 202 and the movement changes may represent a tracking stack associated with the IMU 240 and the computing device 202.

In some implementations, block 606 may be optional. For example, device movement (i.e., movement changes of device 202) may not be detected, but device 202 may still determine an orientation and assess or access the tracking stack 245 associated with device 202, as described above with respect to FIG. 2.

At block 608, the process 600 includes determining, based on the orientation and the movement changes, a rotation angle in which to rotate the first image. For example, the computing device 202 may determine how to rotate particular images to achieve an upright input to the neural network 256 for purposes of performing face tracking estimates and/or lighting estimates and/or gravity-aligned content (e.g., objects, elements, etc.) for use in rendering content in the AR environment. In addition, the rotation angle may be determined to enable simulation of landscape oriented training imagery when portrait-only oriented training imagery has been acquired for training.

At block 610, the process 600 includes rotating the first image to the rotation angle to generate a second image. For example, the determined orientation of device 202 may be used to rotate the first image 310A to generate the second image 310B, for example. In some implementations, the rotation angle is used to align the first image to generate a gravity aligned second image. For example, the rotation angle can be selected such that sky or ceiling is located in an upper portion of the second image when the second image is provided to the neural network 256. In some implementations, the second image 310B is used as training data by the neural network 256 to generate landscape oriented lighting estimates, as shown in FIGS. 3A-5D.

At block 612, the process 600 includes providing, using the processor, the second image to at least one neural network to generate a lighting estimate for the first image based on providing the second image to a neural network. For example, as described above a lighting estimate may be performed for the second image (or any number of images in the case of a live image feed) and such lighting estimates may be accurate because process 600 ensures that images provided to the neural network 256 are in an upright position with sky/ceiling based image content in an upper portion of the image, for example.

In some implementations, the second image is generated to match a capture orientation associated with previously captured training data. For example, to ensure that images provided to the neural network 256 are gravity aligned, the process 600 may perform rotations on images that are determined not to match an orientation associated with images that are used as training data. In some implementations, the second image is used to generate landscape oriented lighting estimates that include lighting that is gravity aligned. In some implementations, the second image is used as input to the neural network to generate landscape oriented content with at least one gravity aligned face in the content.

In some implementations, the first image is rendered in the AR session on the computing device 202 and the second image is provided as gravity-aligned content to at least one machine learning model (e.g., neural network 256 associated with the computing device 202) to trigger an Augmented Reality (AR) experience and/or one or more AR features associated with the first image and the lighting estimates and/or the face tracking estimates. For example, the first image may be rendered as a live camera feed, and a machine learning inference is performed on the second (gravity-aligned/rotated) image, which may be used to add an overlay of AR content to the first image. In another example, the first image may be rendered during the AR session with a rotated face tracking estimate. In some implementations, the face tracking estimate may not be rendered, but may instead be used to render other content, or to implement particular AR experiences and/or features. For example, the second image may be provided to neural network 256 to generate a face tracking estimate that may be used to render virtual cosmetics to a tracked face and to overlay the cosmetics (as AR content) onto a live camera feed of the tracked face. In another example, the neural network may use the first image, the second image, and the neural network to detect when tracked facial features form a smile, and trigger a still photo capture during the precise time when the smile was detected.

In some implementations, the movement changes are associated with an Augmented Reality (AR) session operating on the computing device 202 and the lighting estimate is rotated at an inverse of the rotation angle and the first image is rendered in the AR session on the computing device and using the rotated lighting estimate. In some implementations, AR content is generated and rendered as an overlay on the first image using the rotated lighting estimate. For example, the first image may be rendered as a background image in the AR session on the computing device 202 and the lighting estimate may be used for rendering particular content onto the image or surrounding, partially overlaid, or partially occluding the first image.

In some implementations, the process 600 may also include generating, using the plurality of images, training data for the neural network 256. The training data may include generated (e.g., created, produced, etc.) landscape oriented images based on captured portrait oriented images.

In some implementations, the device 202 may utilize processor assembly 212, computing device orientation 262, and face tracking software 260 to track a captured face (or head) in an image for purposes of generating content in the AR environment that is properly tracked and placed according to face tracking estimates generated using neural networks 256, for example. For example, instead of providing a lighting estimate using the rotation of the first image to the second image, the computing device 202 may instead provide, using the processor, the second image to at least one neural network to generate a face tracking estimate for the first image. The second image may be provided as gravity-aligned content to at least one machine learning model (e.g., neural network 256) to trigger at least one Augmented Reality (AR) feature associated with the first image Such features may include audio content, visual content, and/or haptic content to provide AR experiences in the AR environment.

In some implementations, the image capture device is a front-facing image capture device of the computing device 202 in which a user's face is captured with background content. In some implementations, the first image is captured using the front-facing image capture device, and the first image includes at least one face rotated at the rotation angle to generate the second image. The second image may be aligned with eyes associated with the face located above a mouth associated with the face.

In some implementations, the movement changes are associated with an Augmented Reality (AR) session operating on the computing device and the face tracking estimate is rotated at an inverse of the rotation angle. For example, if the rotation angle indicated a clockwise rotation of 90 degrees, the inverse of the rotation angle would be to rotate counterclockwise 90 degrees (e.g., −90 degrees). The first image may be rendered in the AR session on the computing device 202 using the rotated face tracking estimate.

In some implementations, the second image in the face tracking example may be generated to match a capture orientation associated with previously captured training data. Such data may be used to generate landscape oriented content with properly aligned faces. For example, the computing device 202 may use the face tracking software 260, computing device orientation, and neural networks 256 to generate landscape oriented content with at least one gravity aligned face in the content. In some implementations, the first image is rendered as the background in an AR session on the computing device and the face tracking is used for rendering other content (e.g., audio content, VR content, video content, AR content, lighting, etc.) onto the first image.

Figure 7:
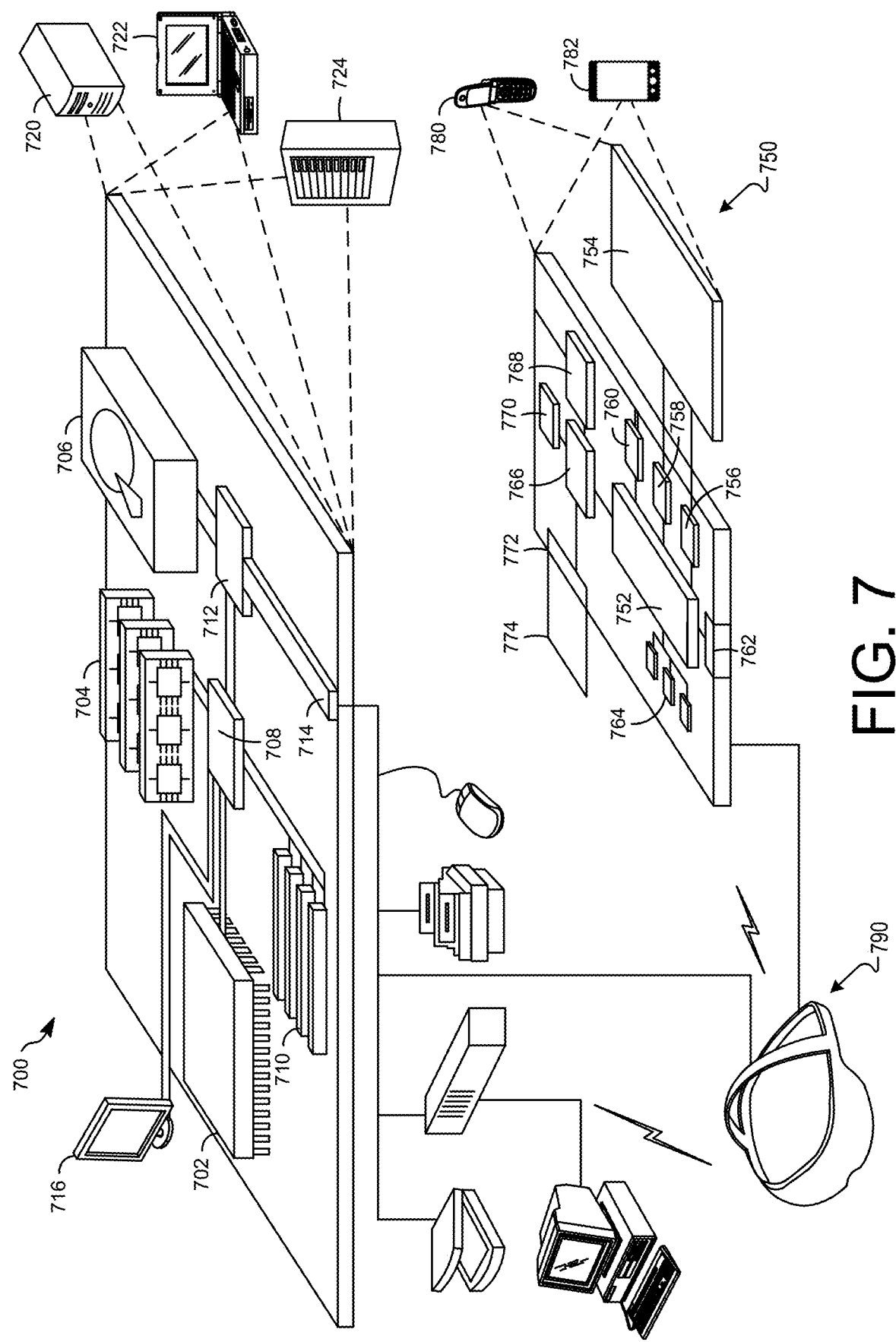
FIG. 7 illustrates an example of a computer device and a mobile computer device, which may be used with the techniques described here.

FIG. 7 shows an example computer device 700 and an example mobile computer device 750, which may be used with the techniques described here. In general, the devices described herein can generate and/or provide any or all aspects of a virtual reality, an augmented reality, or a mixed reality environment. Features described with respect to the computer device 700 and/or mobile computer device 750 may be included in the portable computing device 102 and/or 202 described above. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the systems and techniques claimed and/or described in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, LED display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device based on example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A wearable computing device comprising:
    an image capture device;
    at least one sensor;
    at least one processor; and
    memory storing instructions that, when executed by the at least one processor, cause the processor to:
    obtain, by the image capture device, a first image feed including a plurality of objects tracked by the at least one sensor;
    identify a current image as one of the plurality of images of the first image feed;
    detect, using the at least one sensor, a device orientation of the wearable computing device;
    determine an image orientation of the current image in relation to the device orientation;
    determine, based on the device orientation and the image orientation, a rotation angle in which to rotate the current image to an upright orientation;
    rotate the current image to the rotation angle to generate a second image;
    generate a gravity-aligned version of the plurality of images of the first image feed based on the second image; and
    generate, using a neural network, based on the gravity-aligned version of the plurality of images of the first image feed, Augmented Reality (AR) content for rendering with at least one of the plurality of objects of the first image feed.

2. The wearable computing device of claim 1, wherein the instructions further cause the at least one processor to:
    perform object detection on at least one of the plurality of objects in the first image feed, wherein the determined rotation angle is further based on the object detection.

3. The wearable computing device of claim 1, wherein the wearable computing device comprises augmented reality (AR) glasses.

4. The wearable computing device of claim 1, wherein the instructions further cause the at least one processor to simulate, based on the gravity-aligned version of the plurality of images of the first image feed, data for provision to the at least one neural network, the simulated data being used to generate the AR content for rendering with at least one of the plurality of images of the first image feed.

5. The wearable computing device of claim 1, wherein:
    the detected device orientation occurs during an AR session operating on the wearable computing device; and
    the first image feed is captured and rendered in real time in the AR session on the wearable computing device.

6. The wearable computing device of claim 1, wherein:
    the first image feed is a live camera image feed including the plurality of images; and
    the plurality of images are continuously aligned based on detected movement changes associated with the wearable computing device.

7. The wearable computing device of claim 6, wherein the at least one sensor is an Inertial Measurement Unit (IMU) of the wearable computing device and movement changes represent a tracking stack associated with the and the wearable computing device.

8. A computer-implemented method comprising:
    obtaining, by at least one processor, a first image feed including a plurality of objects tracked by at least one sensor of a wearable computing device;
    identifying, by the at least one processor, a current image as one of the plurality of images of the first image feed;
    detecting, by the at least one processor, a device orientation of the wearable computing device;
    determining, by the at least one processor, an image orientation of the current image in relation to the device orientation;
    determining, based on the device orientation and the image orientation, a rotation angle in which to rotate the current image to an upright orientation;
    rotating, by the at least one processor, the current image to the rotation angle to generate a second image;
    generating a gravity-aligned version of the plurality of images of the first image feed based on the second image; and
    generating, using a neural network, based on the gravity-aligned version of the plurality of images of the first image feed, Augmented Reality (AR) content for rendering with at least one of the plurality of objects of the first image feed.

9. The computer-implemented method of claim 8, wherein the at least one processor is further configured to:
    perform object detection on at least one of the plurality of objects in the first image feed, wherein the determined rotation angle is further based on the object detection.

10. The computer-implemented method of claim 8, wherein the wearable computing device comprises augmented reality (AR) glasses.

11. The computer-implemented method of claim 8, wherein the at least one processor is further configured to simulate, based on the gravity-aligned version of the plurality of images of the first image feed, data for provision to the at least one neural network, the simulated data being used to generate the AR content for rendering with at least one of the plurality of images of the first image feed.

12. The computer-implemented method of claim 8, wherein:
    the detected device orientation occurs during an AR session operating on the wearable computing device; and
    the first image feed is captured and rendered in real time in the AR session on the wearable computing device.

13. The computer-implemented method of claim 8, wherein:
    the first image feed is a live camera image feed including the plurality of images; and the plurality of images are continuously aligned based on detected movement changes associated with the wearable computing device.

14. The computer-implemented method of claim 13, wherein the at least one sensor is an Inertial Measurement Unit (IMU) of the wearable computing device and movement changes represent a tracking stack associated with the IMU and the wearable computing device.

15. A non-transitory computer-readable medium comprising instructions that, when executed, are configured to cause at least one processor to:
   obtain, by the image capture device, a first image feed including a plurality of objects tracked by the at least one sensor;
   identify a current image as one of the plurality of images of the first image feed;
   detect, using the at least one sensor, a device orientation of the wearable computing device;
   determine an image orientation of the current image in relation to the device orientation;
   determine, based on the device orientation and the image orientation, a rotation angle in which to rotate the current image to an upright orientation;
   rotate the current image to the rotation angle to generate a second image;
   generate a gravity-aligned version of the plurality of images of the first image feed based on the second image; and
   generate, using a neural network, based on the gravity-aligned version of the plurality of images of the first image feed, Augmented Reality (AR) content for rendering with at least one of the plurality of objects of the first image feed.

16. The computer-readable medium of claim 15, wherein the instruction are further configured to cause the at least one processor to:
   perform object detection on at least one of the plurality of objects in the first image feed, wherein the determined rotation angle is further based on the object detection.

17. The computer-readable medium of claim 15, wherein the wearable computing device comprises augmented reality (AR) glasses.

18. The computer-readable medium of claim 15, wherein the instructions further cause the at least one processor to simulate, based on the gravity-aligned version of the plurality of images of the first image feed, data for provision to the at least one neural network, the simulated data being used to generate the AR content for rendering with at least one of the plurality of images of the first image feed.

19. The computer-readable medium of claim 15, wherein:
   the detected device orientation occurs during an AR session operating on the wearable computing device; and
   the first image feed is captured and rendered in real time in the AR session on the wearable computing device.

20. The computer-readable medium of claim 15, wherein:
   the first image feed is a live camera image feed including the plurality of images; and
   the plurality of images are continuously aligned based on detected movement changes associated with the wearable computing device.

* * * * *